(12) United States Patent
Urquhart et al.

(10) Patent No.: US 11,073,689 B2
(45) Date of Patent: Jul. 27, 2021

(54) METHOD AND SYSTEM FOR CALIBRATING A WEARABLE HEADS-UP DISPLAY TO PRODUCE ALIGNED VIRTUAL IMAGES IN AN EYE SPACE

(71) Applicant: GOOGLE LLC, Mountain View, CA (US)

(72) Inventors: Daniel Thomson Urquhart, Kitchener (CA); Daniel Balzerson, Kitchener (CA); Marius Kintel, Kitchener (CA)

(*) Notice: Subject to any disclaimer, the term of this patent is extended or adjusted under 35 U.S.C. 154(b) by 0 days.

(21) Appl. No.: 16/550,500

(22) Filed: Aug. 26, 2019

(65) Prior Publication Data

US 2020/0073119 A1 Mar. 5, 2020

Related U.S. Application Data

(60) Provisional application No. 62/725,949, filed on Aug. 31, 2018.

(51) Int. Cl.
| | | |
|---|---|---|
| *G06F 3/01* | (2006.01) | |
| *G02B 27/00* | (2006.01) | |
| *H04N 9/31* | (2006.01) | |
| *G02B 27/01* | (2006.01) | |

(52) U.S. Cl.
CPC ....... *G02B 27/0093* (2013.01); *G02B 27/017* (2013.01); *G06F 3/013* (2013.01); *H04N 9/3194* (2013.01); *G02B 2027/014* (2013.01); *G02B 2027/0138* (2013.01); *G02B 2027/0178* (2013.01); *H04N 9/3147* (2013.01); *H04N 9/3197* (2013.01)

(58) Field of Classification Search
CPC ...... G02B 2027/011; G02B 2027/0138; G02B 2027/014; G02B 2027/0178; G02B 2027/0181; G02B 27/0093; G02B 27/017; G02B 27/0172; G06F 3/012; G06F 3/013; H04N 9/3147; H04N 9/3194; H04N 9/3197

See application file for complete search history.

(56) References Cited

U.S. PATENT DOCUMENTS

| | | | |
|---|---|---|---|
| 6,753,907 B1 | 6/2004 | Sukthankar et al. | |
| 7,001,023 B2 * | 2/2006 | Lee | H04N 9/3185 |
| | | | 348/745 |
| 8,195,006 B2 | 6/2012 | Klemmer et al. | |
| 9,872,003 B1 | 1/2018 | Urquhart et al. | |
| 9,958,682 B1 | 5/2018 | Moore et al. | |
| 9,992,464 B1 | 6/2018 | Urquhart et al. | |
| 2010/0149073 A1 * | 6/2010 | Chaum | G02B 27/0172 |
| | | | 345/8 |
| 2011/0228104 A1 | 9/2011 | Nelson | |

(Continued)

OTHER PUBLICATIONS

Jordan, S. J., Projector-Camera Calibration using Gray code Patterns, Master's Thesis, Queen's University (2010).

(Continued)

*Primary Examiner* — Ram A Mistry

(57) ABSTRACT

A wearable heads-up display has stored therein two or more distortion models for use in generating distorted source images that when projected by the wearable heads-up display into a target eye space form virtual images are aligned in the target eye space. A method and system for determining the distortion models are disclosed.

22 Claims, 11 Drawing Sheets

(56) References Cited

U.S. PATENT DOCUMENTS

2015/0229897 A1* 8/2015 Mukawa .............. G02B 27/017
  345/593
2017/0329136 A1* 11/2017 Bates .................... G06T 3/0093

OTHER PUBLICATIONS

Salvi, J., Pages, J., & Battle, J., Pattern Codification Strategies in Structured Light Systems, Pattern Recognition 37 (2004) 827-849.
Zhang J, Zhang Y & Chen B., Out-of-Focus projector calibration method with distortion correction on the projection plane in the structured light three-dimensional measurement system, Sensors 2017, 17, 2963.

* cited by examiner

METHOD AND SYSTEM FOR CALIBRATING A WEARABLE HEADS-UP DISPLAY TO PRODUCE ALIGNED VIRTUAL IMAGES IN AN EYE SPACE

CROSS-REFERENCE TO RELATED APPLICATIONS

This application claims the benefit of U.S. Provisional Application No. 62/725,949, filed 31 Aug. 2018, titled "Method and System for Calibrating a Wearable Heads-Up Display to Produce Aligned Virtual Images in an Eye Space", the content of which is incorporated herein in its entirety by reference.

FIELD

The present disclosure relates generally to display performance of wearable heads-up displays and particularly to positioning of content in an eye space.

BACKGROUND

A scanning light projector (SLP)-based wearable heads-up display (WHUD) is a form of virtual retinal display in which a SLP draws a raster scan onto the eye of the user. The SLP projects light over a fixed area called the exit pupil of the display. The display may have a single exit pupil or multiple exit pupils, each of which may receive light (or image(s)) projected by the SLP. Multiple exit pupils are used to increase the size of the eyebox of the display beyond what is possible with a single exit pupil for a given size display. The eyebox is the volume of space within which an effectively viewable image is formed by the display. When the eye pupil is positioned inside this volume, the user is able to see all of the content on the virtual display. Conversely, when the eye pupil is outside of this volume, the user will not be able to see at least some of the content on the virtual display.

To produce a display UI (or content) that is seen by the eye, several virtual images are typically formed in the eye space by projecting several source images into the eye space through the exit pupil(s) of the display. In displays of particular interest herein, there will be K source images and corresponding K virtual images for each exit pupil of the display, where K is the number of color channels used by the projector. If the display has N spatially separated (or separately addressable) exit pupils, there will be N times K source images projected from the projector space and corresponding N times K virtual images formed in the eye space. As an example, if the projector uses red, green, and blue color channels and the display has 4 spatially separated (or separately addressable) exit pupils, there will be a set of red, green, and blue source images and corresponding red, green, and blue virtual images formed in the eye space per exit pupil, for a total of 12 virtual images formed in the eye space. Each of these 12 virtual images will contribute to forming the display UI in the eye space.

In general, the virtual images formed in the eye space differ from each other because the virtual images come from different color channels of the projector and/or because the virtual images come from different exit pupils of the display and have experienced different optical paths, and nonlinear distortion, from the projector to the eye space. The optical system of the display may be designed such that the virtual images produced from the different optical paths overlap in the eye space. Thus, the display UI may be made of overlapping portions of the virtual images. In order to produce a display UI that appears as designed, e.g., with reference to a regular, rectilinear pixel, these overlapping portions of the virtual images that form the display UI need to be aligned in the eye space. The virtual images, or overlapping portions thereof, are considered to be aligned in the eye space if for every point of the display UI, all the points of the virtual images that should contribute to the point of the display UI are aligned in the eye space. That is, the contributing points of the virtual images appear to come from the same point in the eye space.

SUMMARY

A method of calibrating a wearable heads-up display (WHUD) may be summarized as including: for each virtual image to be produced by the WHUD, (a.1) determining a distortion model for use in distorting a source image corresponding to the virtual image. Determining a distortion model (a.1) may be summarized generally as including: (a.1.1) projecting a set of test patterns by a projector of the WHUD in a select sequence, (a.1.2) capturing an image of each test pattern projected by the projector by a camera, (a.1.3) determining a first mapping that maps points in a projector space to points in a camera space from the captured images, (a.1.4) acquiring a second mapping that maps point in the camera space to points in the target eye space, (a.1.5) determining a third mapping that maps points from the target eye space to points in the projector space based on the first mapping and the second mapping, and (a.1.6) storing the third mapping as the distortion model for use in distorting the source image corresponding to the virtual image.

Determining a first mapping of (a.1.3) may include decoding the captured images to find correspondence between projector frame buffer pixels and camera pixels. Decoding the captured images to find correspondence between projector frame buffer pixels and camera pixels may include detecting Gray codes in the captured images.

Determining a third mapping of (a.1.5) may include identifying at least one region of interest in the target eye space and determining the third mapping for the at least one region of interest in the target eye space.

Determining a distortion model of (a.1) may be performed at a first temperature to obtain a distortion model at the first temperature and at a second temperature to obtain the distortion model at the second temperature.

Projecting a set of test patterns of (a.1.1) may include: for each position in the select sequence, generating copies of the test pattern at that position and projecting the copies of the test pattern by the projector of the WHUD, wherein each of the copies corresponds to a unique combination of exit pupil and color channel of the WHUD. Capturing an image of (a.1.2) may include capturing an image having image portions corresponding to the copies of the test patterns by the camera. Determining a first mapping of (a.1.3) may include determining the first mapping for each unique combination of color channel and exit pupil using the image portions of the captured image corresponding to the unique combination of color channel and exit pupil.

The method may further include (a.2) generating the set of test patterns prior to determining a distortion model of (a.1). Generating the set of test patterns of (a.2) may include generating at least one pattern that carries codes. Generating at least one pattern that carries codes may include generating the at least one pattern with a m-bit Gray code, where m≥1.

Determining a first mapping of (a.1.3) may include decoding the at least one pattern that carries codes. Generating the set of test patterns of (a.2) may include generating at least one additional pattern having features with known positions in a frame buffer of the projector. Determining a first mapping of (a.1.3.) may include decoding the at least one pattern that carries codes and the at least one additional pattern having features with known positions in the frame buffer of the projector.

Projecting a set of test patterns of (a.1.1) may include transmitting the set of test patterns to a processor of the WHUD, where the processor of the WHUD renders the set of test patterns into a frame buffer of the projector in the select sequence.

Storing the third mapping of (a.1.6) may include storing the third mapping in a non-transitory processor-readable storage medium of the WHUD.

Capturing an image of (a.1.2) may include positioning the camera relative to the WHUD to capture at least a portion of images projected by the WHUD.

A WHUD calibration system may be summarized as including: a WHUD including a projector, a camera positioned and oriented to capture images projected by the projector, a calibration processor communicatively coupled to the WHUD and camera, and a non-transitory processor-readable storage medium communicatively coupled to the processor. The non-transitory processor-readable storage medium stores data and/or processor-executable instructions that, when executed by the calibration processor, cause the calibration processor to determine a distortion model that maps points from a target eye space to points in a projector space for each virtual image to be produced in the target eye space by the wearable heads-up display.

The WHUD may include a processor, and the calibration processor may be communicatively coupled to the processor of the WHUD.

A method of forming a display UI on a WHUD may be summarized as including: (b.1) generating N times K distorted source images, wherein N≥1 and K≥1 and N times K>1, by applying N times K different distortion models to K source images, wherein each of the K different distortion models maps points from a target eye space to points in a projector space corresponding to one of the K source images, wherein N is the number of separately addressable exit pupils of the display and K is the number of color channels of the display, and (b.2) projecting at least two of the distorted source images from the projector space to the target eye space, wherein the at least two of the distorted source images form at least two virtual images in the target eye space that are aligned in the target eye space. Alternatively, in projecting of (b.2), each of the N times K distorted source images may be projected from the projector space to the target eye space, wherein the N times K distorted source images form N times K virtual images in the target eye space that are aligned in the target eye space.

Generating distorted source images of (b.1) may include applying the N times K distortion models to the K source images when rendering the K source images into a projector frame buffer of the WHUD.

Generating distorted source images of (b.1) may include applying the N times K different distortion models to the K source images after rendering the K source images into a projector frame buffer of the WHUD.

Projecting distorted source images of (b.2) may include generating light and modulating the light with the at least two of the distorted source images.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various implementations or embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIGS. 10A-1 to 10A-5 are screenshots of actual test patterns used in the process of FIG. 9 according to one example.

FIG. 10B-1 to 10B-5 are screenshots of images captured from projecting the test patterns of FIGS. 10A-1 to 10A-5, respectively, according to one example.

DETAILED DESCRIPTION

Figure 1:
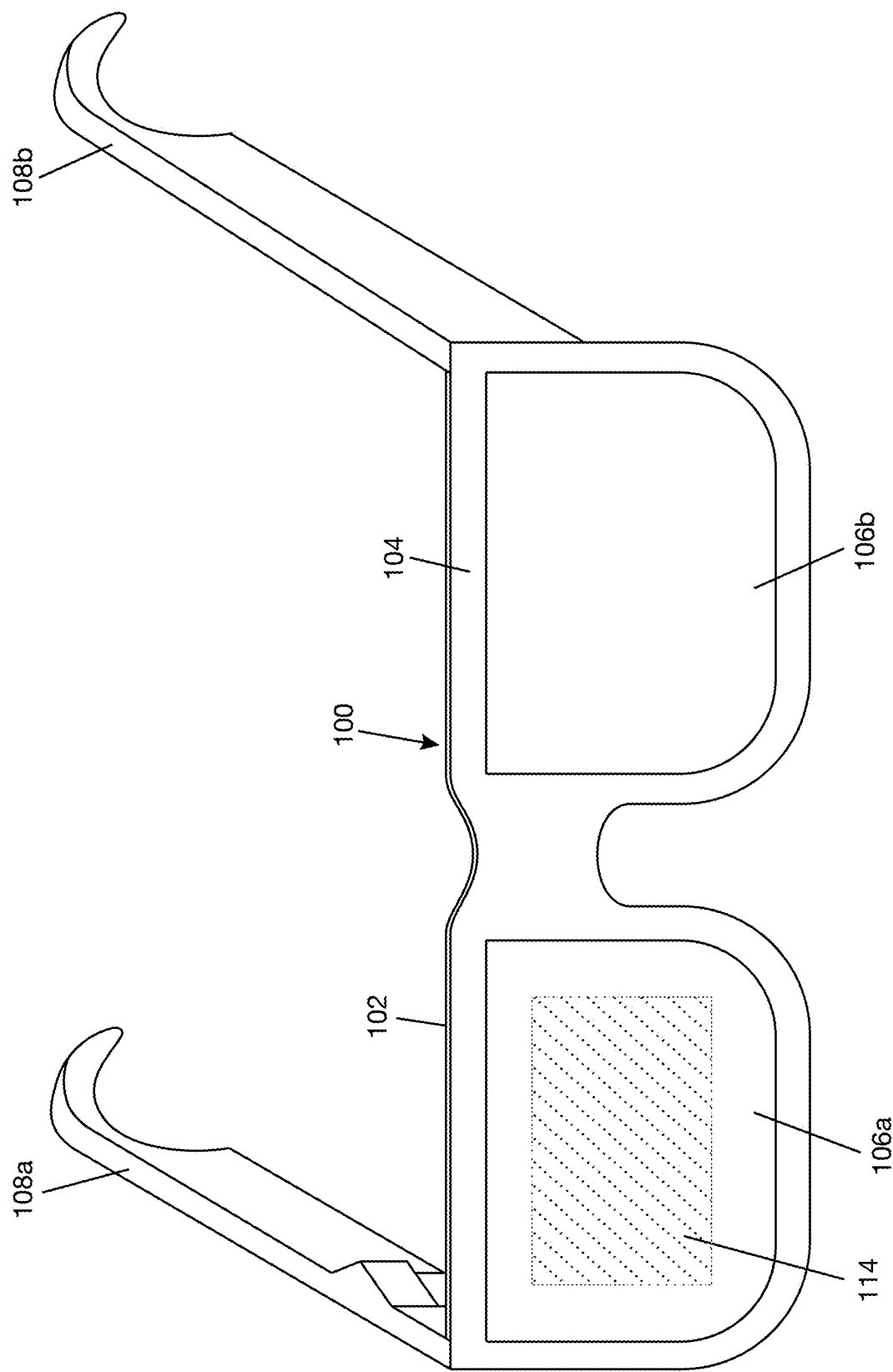
FIG. 1 is a frontal perspective view of an example wearable heads-up display (WHUD).

In the following description, certain specific details are set forth in order to provide a thorough understanding of various disclosed implementations or embodiments. However, one skilled in the relevant art will recognize that implementations or embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the implementations or embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

Unless the context requires otherwise, throughout the specification and claims which follow, the word "comprise" and variations thereof, such as, "comprises" and "comprising" are to be construed in an open, inclusive sense, that is as "including, but not limited to."

In the present disclosure, reference to "one implementation" or "an implementation" or to "one embodiment" or "an embodiment" means that a particular feature, structures, or characteristics may be combined in any suitable manner in one or more implementations or one or more embodiments.

In the present disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the present disclosure are for convenience only and do not interpret the scope or meaning of the embodiments or implementations.

The following citations may be referenced in the present disclosure:

"Camera Calibration with OpenCV, Open CV 2.4.13.7 Documentation", "docs.opencv.org/2.4/doc/tutorials/calib3d/cameracalibration/cameracalibration.html", Web. 9 Aug. 2018.

Salvi, J. et al. 2004, "Pattern codification strategies in structured light systems," Pattern Recognition, vol. 37, pp. 827-849.

The following terms may be used in the present disclosure:

User—a subject wearing a wearable heads-up display.

Display UI—visual elements that will be shown in an eye space to a user.

Exit Pupil—a fixed area where light projected by a display converges.

Virtual Image—an image that exists conceptually but is not actually formed on a surface. For example, a scanning laser-based wearable heads-up display forms a virtual image that appears to be floating several inches in front of the user.

Eye Space—the space in which the virtual image appears from the perspective of an eye of a user, typically measured in degrees or as a width and height at a given apparent depth.

Projector Space—the addressable projection region for the projector that generates each virtual image. The source for each virtual image may have its own projector space or may share a projector space with other virtual images. The projector space is typically measured in pixels.

Frame buffer—a memory buffer containing at least one complete frame of data. The term "frame buffer image" may refer to the frame(s) of data contained in the frame buffer. The projector of a display has an associated frame buffer. The term "frame buffer space" and "projector space" may be used interchangeably. In some implementations, there may not be a physical memory buffer which contains the entire frame of data. For example, a streaming implementation might apply all the described calculations "on the fly" as the values are sent to the projector modulator.

Camera Space—the addressable space of the camera, typically measured in pixels. This is typically a dense pixel grid but may also comprise a sparse set of points when alternative optical sensor topologies are employed.

X to Y mapping—a concrete implementation mapping from X to Y (e.g., camera space to eye space), where the mapping may be implemented in several different ways (e.g., a lookup table or a parameterized polynomial). In general, where used below an X to Y mapping can be inverted to Y to X mapping using common numerical methods, and the actual implementation may use either or both of these models.

MSB—Most significant bit, also called high-order bit. This is the bit position in a binary number having the greatest value.

LSB—Least significant bit. This is the bit position in a binary number giving the units value.

In one example, a scanning light projector (SLP)-based wearable heads-up display (WHUD) produces virtual images in an eye space by projecting source images from N different regions of a projector frame buffer. The optical system of the WHUD is designed such that the virtual images overlap in the eye space. However, it is often the case that the WHUD as manufactured does not automatically produce virtual images that are aligned in the eye space. Even after the optics in the system have been precisely aligned, there may still be misalignments in the virtual images in the eye space due to the unique path and unique nonlinear distortion that produced each virtual image.

A process of calibrating a WHUD to produce virtual images that are aligned in an eye space is described herein. In general, the process includes determining distortion models that can be applied to source images such that when the source images are distorted and projected to the eye space, the distorted source images form virtual images that are aligned in target region(s) of the eye space. The target region(s) of the eye space may include where the virtual images overlap in the eye space. The process may be applied whether images are coming from different regions of the projector frame buffer or from the same region of the projector frame buffer. The process may be applied to any WHUD that produces at least two virtual images in the eye space where the at least two virtual images are different in terms of optical path and/or nonlinear distortion. For example, the at least two virtual images may be characterized by unique combinations of color channel and exit pupil. As a further example, the two virtual images may differ by color channel or by exit pupil or by both exit pupil and color channel.

FIG. 1 illustrates an example of a WHUD 100 that may be calibrated to produce virtual images that are overlapped and aligned in an eye space according to a process described herein. WHUD 100 may have an appearance of eyeglasses (or glasses), as shown in FIG. 1, or other near-eye display form, such as goggles and the like. WHUD 100 includes a support frame 102 that is intended to be worn on a head of a user. Support frame 102 carries the devices, electronics, and software that enable WHUD 100 to present a display UI in an eye space. In one example, support frame 102 includes a frame front 104 carrying a pair of transparent lenses 106a, 106b and temples 108a, 108b attached to opposite sides of the frame front 104. A transparent combiner 114 may be integrated in lens 106a. Many of the components of WHUD 100, such as SLP and electronics module, are carried by or within temples 108a, 108b. Frame front 104 may also carry some components of WHUD 100, such as conductors that enable communication between components carried by or within temples 108a, 108b and antennas.

Figure 2:
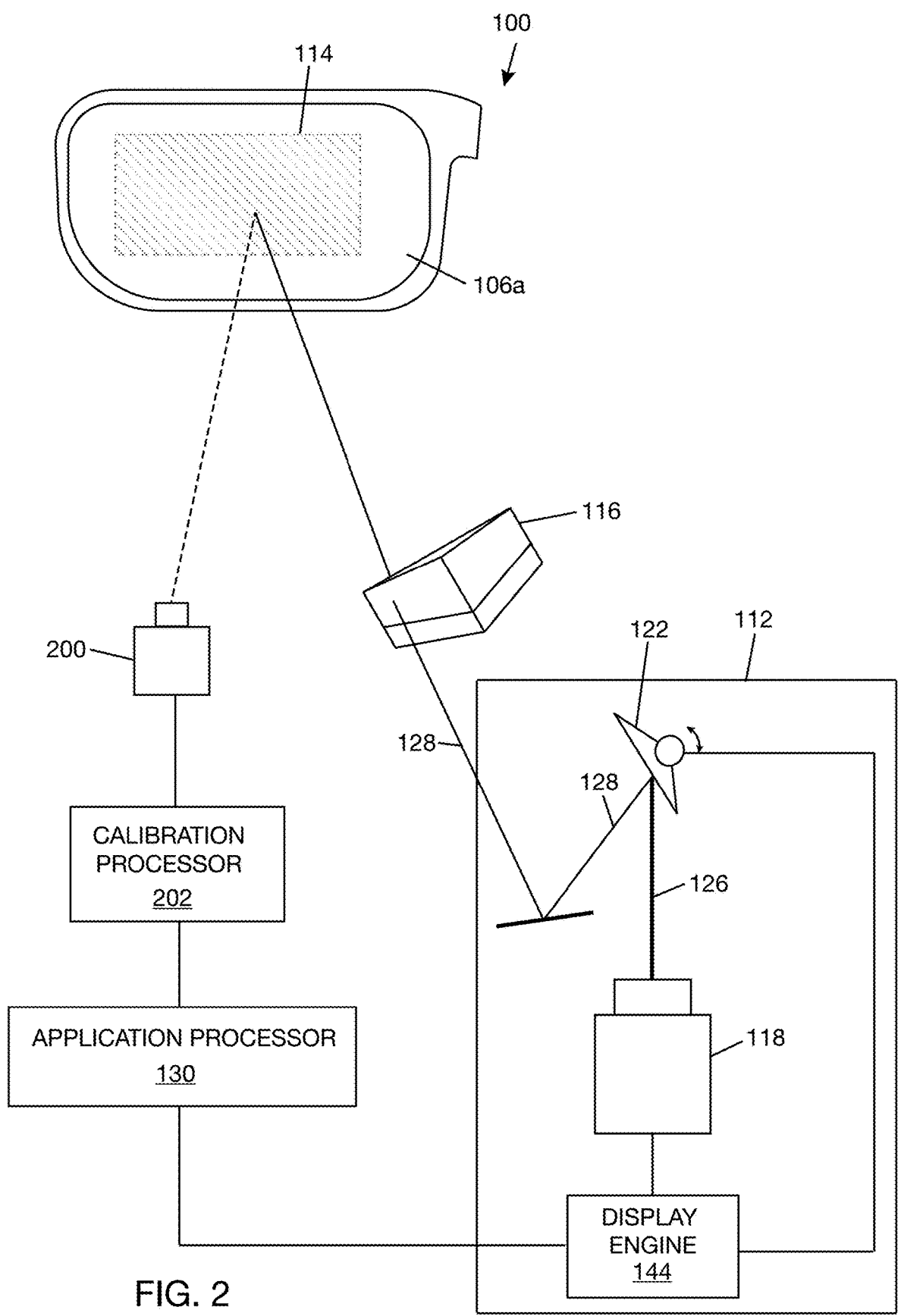
FIG. 2 is a schematic/block diagram of a setup for calibrating a WHUD according to one illustrative implementation of the present disclosure.

FIG. 2 is a schematic diagram showing a setup for calibrating WHUD 100 to produce virtual images that are overlapped and aligned in an eye space according to one illustrative implementation. The setup includes, besides WHUD 100, a camera 200 that is positioned relative to WHUD 100 to capture images of test patterns projected by WHUD 100. The setup may further include a calibration processor 202 communicatively coupled to camera 200 and WHUD 100. Calibration processor 202 may run program instructions that receive captured images from camera 200 and determine mappings from the eye space to the projector space based at least in part on the captured images. In the interest of clarity and because WHUD 100 may be configured in multiple ways, only a portion of WHUD 100 is shown in FIG. 2 and described. In general, the components of WHUD 100 shown in FIG. 2 pertain to presenting a display UI in the eye space.

WHUD 100 includes a SLP 112 and a transparent combiner 114. Over a scan period (or a total range of scan orientations), SLP 112 projects light signals to transparent combiner 114, and transparent combiner 114 selectively redirects the light to exit pupil(s) of the display. The light signals may be modulated with image data from the projector frame buffer. In one implementation, an optical splitter 116 is positioned in an optical path between the SLP 112 and transparent combiner 114. In one example, optical splitter 116 may be a faceted optical structure such as described, for example, in U.S. Pat. No. 9,989,764 ("Systems, Devices, and Methods for Eyebox Expansion in Wearable Heads-up Displays"). Optical splitter 116 receives light signals from SLP 112 and redirects the light signals received over each of N sub-ranges of scan orientations to a respective area of the transparent combiner 114, where the transparent combiner 114 redirects the light signals to respective exit pupil(s). In one implementation, WHUD 100 has N exit pupils corresponding to the N sub-ranges of scan orientations, where N>1.

SLP 112 includes a light engine 118 that is operable to generate visible light. Light engine 118 may also generate infrared light, e.g., for eye tracking purposes. Light engine 118 may have any number and combination of light sources to generate visible light and, optionally, infrared light. In one example, light engine 118 includes a plurality of visible laser diodes (not shown separately), or other visible light sources, to generate visible light in different wavebands. As a further example, the visible laser diodes may include a laser diode to generate red light, a laser diode to generate green light, and a laser diode to generate blue light. Light engine 118 may include optics to combine the output beams of the multiple laser diodes, or multiple light sources, into a single combined beam 126. Light signals from light engine 118 may be modulated with projector frame buffer data in order to project an image to exit pupil(s) of the display.

SLP 112 further includes an optical scanner 122 that receives at least a portion of beam 126 from light engine 118 and produces a deflected beam 128. Deflected beam 128 is produced for each scan orientation of the optical scanner 122. Optical splitter 116 (or transparent combiner 114) is positioned to receive deflected beam 128 from optical scanner 122. In one example, optical scanner 122 includes at least one scan mirror, such as a two-dimensional scan mirror or two orthogonally-oriented mono-axis mirrors that each rotate about its respective axis. The mirror(s) of optical scanner 122 may be microelectromechanical systems (MEMS) mirrors, piezoelectric mirrors, and the like. In other implementations, optical scanner 122 may be a mirrorless optical scanner, such as a fiber optic scanner, or may include a combination of mirror and mirrorless optical scanning elements.

In one implementation, transparent combiner 114 may be a holographic combiner having at least one hologram that is responsive to visible light or multiplexed holograms that are responsive to visible light. In one example, the holographic combiner may include at least N multiplexed holograms, and each one of the at least N multiplexed holograms may converge light received from a respective one of the N facets of optical splitter 116 to a respective one of the N exit pupils of the display. Alternatively, the holographic combiner may include multiplexed holograms, each of which is responsive to light from one of the color channels of the projector. The holographic combiner may have other types of holograms, such as one that is responsive to infrared light. In another implementation, transparent combiner 114 may be a lightguide (or waveguide) with an input coupler to receive light into the light guide from scanning laser projector 112 and an output coupler to output light from the light guide. Optical splitter 116 may be omitted when transparent combiner 114 is a lightguide or waveguide.

For the calibration setup, camera 200 is positioned relative to WHUD 100 to capture images projected to transparent combiner 114 by SLP 112. The position of camera 200 relative to WHUD 100 may be fixed during the calibration process, in which case the field of view of camera 200 should be sufficient to allow capturing of an image projected to any of the exit pupils, or images projected to all of the exit pupils, of the display without moving the camera. Alternatively, the position of camera 200 relative to WHUD 100 may be adjustable during the calibration process such that camera 200 can be centered at a target exit pupil when an image is to be captured at the target exit pupil. In one example, camera 200 may be a CCD or CMOS device with a lens and a relatively high spatial resolution. In another example, camera 200 may be a device that is light sensitive and provides intensity information about at least a point (or small area) of a projected image. For example, camera 200 may be an array of photodetectors to capture a relatively small number of pixels or may even be a single photodetector (or single pixel camera). Camera 200 may be a color camera, which may allow capturing of multiplexed color images, or a monochrome camera.

WHUD 100 may include an application processor (AP) 130, which is an integrated circuit (e.g., microprocessor) that runs a range of software of the WHUD. In the example shown in FIG. 3, AP 130 may include a processor 132, GPU 134, and memory 136. Processor 132 and GPU 134 may be communicatively coupled to memory 136, which may be a temporary storage to hold data and instructions that can be accessed quickly by processor 132 and GPU 134. Storage 138 may be a more permanent storage to hold data and instructions. Each of memory 136 and storage 138 may be a non-transitory processor-readable storage medium that stores data and instructions and may include one or more of random-access memory (RAM), read-only memory (ROM), Flash memory, solid state drive, or other processor-readable storage medium. Processor 132 may be a programmed computer that performs computational operations. For example, processor 132 may be a central processing unit (CPU), a microprocessor, a controller, an application specific integrated circuit (ASIC), system on chip (SOC) or a field-programmable gate array (FPGA).

To form a display UI in an eye space, GPU 134 may receive source images from processor 132 and write or render the source images into the projector frame buffer, which may be transmitted to display controller 142 of display engine 144. Display controller 142 may provide the frame buffer data to light engine driver 146, e.g., laser diode driver, and scan mirror driver 148. In order to project the source images to the transparent combiner (114 in FIG. 2), light engine driver 146 uses the frame buffer data to generate drive controls for the laser diodes (or other light sources) in the light engine 118, and scan mirror driver 148 uses the frame buffer data to generate sync controls for the scan mirror(s) of the optical scanner 122. During normal operation of WHUD 100, any corrections to the source images to be projected to transparent combiner 114 may be applied when rendering the source images into the projector frame buffer, or the display controller 142 may apply the corrections prior to providing the frame buffer data to light engine driver 146 and scan mirror driver 148. Several corrections, such as geometric distortions (determined by the calibration process described herein), color correction, and other corrections due to thermal changes in the optical system, may be applied to the source images to achieve a target display performance. The correction model may be decomposed into multiple stages, where each stage is applied at a separate stage in the process. For example, a first stage of the correction model may be applied at GPU 134, and a second stage of the correction model may be applied at a second processor, e.g., a SLP processor.

Calibration processor 202 is communicatively coupled to camera 200 to receive images or light intensity data captured by camera 200 during the calibration process. The adjective "calibration" before processor is generally used to distinguish this processor from other processor(s) used for normal operation of the WHUD since the calibration processor can be decoupled from the WHUD once calibration is complete; although, conceivably, the functionality of the calibration processor may be performed by a processor used in normal operation of the WHUD. In general, a processor that executes a calibration process as described herein may be referred to as a calibration processor. In addition, calibration processor may be a programmed computer that performs computational operations. For example, processor may be a central processing unit (CPU), a microprocessor, a controller, an application specific integrated circuit (ASIC), system on chip (SOC) or a field-programmable gate array (FPGA). Although not shown, a display screen may be communicatively coupled to calibration processor to allow interaction with a calibration program running on calibration processor and/or to allow calibration processor to display calibration results from the calibration program.

Figure 3:
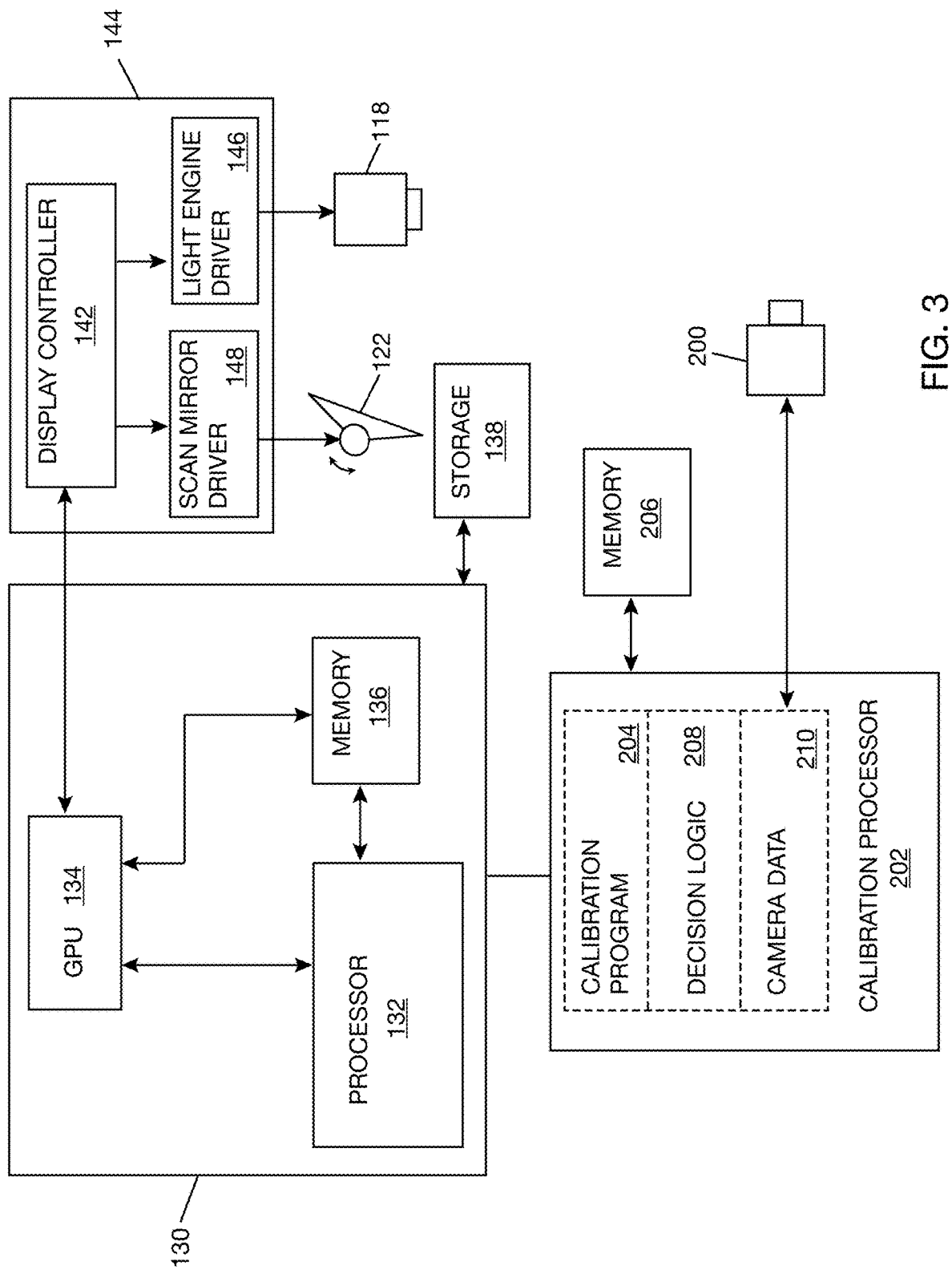
FIG. 3 is a block diagram showing interaction of a calibration processor with an application processor of a WHUD according to one illustrative implementation of the present disclosure.

Calibration processor 202 may also be communicatively coupled to application processor 130 for calibration purposes. In FIG. 3, calibration processor 202 is shown executing instructions of a calibration program 204. Calibration program 204 may be stored in memory 206 and accessed by calibration processor 202 at run time. Calibration program 204 includes decision logic 208, which when executed by calibration processor 202, in one implementation, provides test patterns in a defined sequence to AP 130. The defined sequence may be adjusted during the calibration process. Therefore, the term "defined" is to the extent needed for decoding of captured images of the projected test patterns. AP 130 renders the test patterns in the defined sequence into the projector frame buffer. Camera 200 captures images of the test patterns as the test patterns are projected by SLP 112 (in FIG. 2) by way of transparent combiner 114 (in FIG. 2). Calibration processor 202 receives camera data 210 from camera 200, and the calibration program 204 uses camera data 210 to determine the eye space to projector space mappings that will be subsequently used to generate warped source images.

The calibration process includes projecting test patterns from the projector frame buffer (or projector space) to the camera space. In one implementation, the test patterns are structured light projection patterns that when projected to a scene in a defined sequence allow each pixel of the scene to be uniquely identified. In the setup of FIG. 2, the scene is the transparent combiner. The test patterns may be generated using structured pattern codification techniques known in the art (see, e.g., Salvi, 2004, p. 829). In one implementation, the test patterns enable correspondence between points in the projector space and points in the camera space to be found. The test patterns may be formed using one or more of structures such as stripes, grids, and dots. The following is a description of test patterns, but the test patterns that may be used are not limited to the ones described below.

Figure 4:
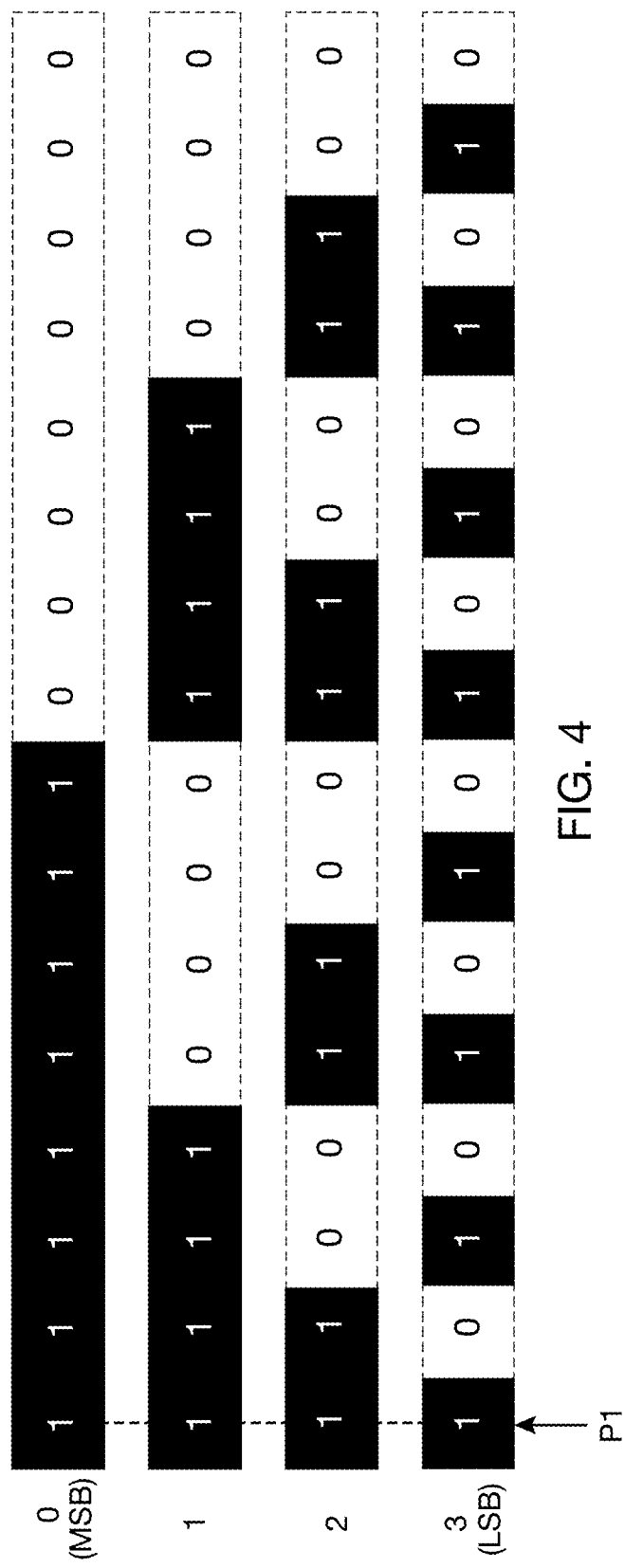
FIG. 4 is a schematic diagram of a sequence of patterns generated from a binary code of 4 bits.

In one example, test patterns may be generated with binary codes. For illustration purposes, FIG. 4 shows four patterns generated from a binary code of 4 bits, where the value goes from 0 to 15. Thus, for example, if the patterns 0 to 3 are projected in the sequence shown, a pixel corresponding to the bits at position P1 will have the value 1 1 1 1, which is 15. In general, a binary code of 4 bits can encode $16(=2^4)$ unique stripes. To encode a frame buffer using binary code, more than 4 bits would be needed. For example, if the usable area of a frame buffer has a size of 1024×512 pixels, the x axis (1024 pixels) can be encoded with a binary code of 10 bits (10 patterns), and the y axis (512 pixels) can be encoded with a binary code of 9 bits (9 patterns). In FIG. 4, the first pattern 0 (corresponding to the most significant bit (MSB)) has a stripe width of 8. The second pattern 1 has a stripe width of 4. The third pattern 2 has a stripe width of 2. The last and fourth pattern 3 (corresponding to the least significant bit (LSB)) has a stripe width of 1. Thus, the minimum stripe width is 1. The number of transitions, or edges, in a pattern determines the edge frequency of the pattern. For example, first pattern 0 contains 2 edges or transitions (if the pattern is wrapped around) and has the lowest pattern edge frequency, and the fourth pattern 3 contains 16 edges or transitions and has the highest frequency. Thus, the maximum number of edges or transitions is 16. A low minimum stripe width generally correlates to a high pattern edge frequency. In many cases, a minimum stripe width of 1 would be too small because the stripe pattern would not be easy to detect.

Figure 5:
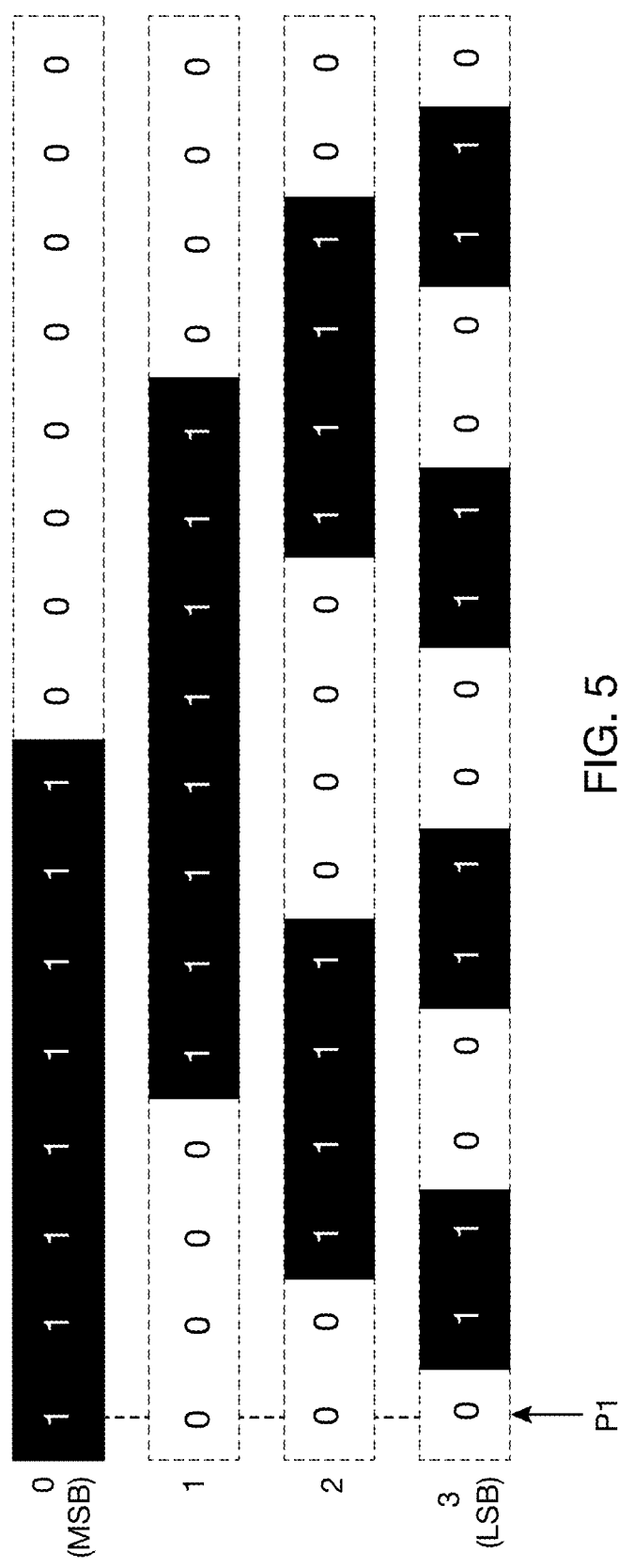
FIG. 5 is a schematic diagram of a sequence of patterns generated from a Gray code of 4 bits.

In another example, test patterns may be generated with Gray codes. Gray code is a coding system where two consecutive integers are represented by binary numbers differing in only one digit. For illustration purposes, FIG. 5 shows four patterns generated from a Gray code of 4 bits, where the value goes from 0 to 15. Thus, for example, if the patterns 0 to 3 are projected in the sequence shown, a pixel corresponding to the bits at position P1 will have the value 1 0 0 0, which is 8. As in the binary coding case, 4 bits can encode $16(=2^4)$ unique stripes, and more bits will be needed to encode each axis of a frame buffer. In FIG. 5, the first pattern 0 (MSB) has a stripe width of 8. The second pattern 1 has a stripe width of 8. The third pattern 2 has a stripe width of 4. The last and fourth pattern 3 (LSB) has a stripe width of 2. Thus, the minimum stripe width is 2 for Gray code, compared to 1 for binary code for the same resolution.

The pattern edge frequency of the last pattern 3 of the Gray code pattern is 8, whereas it was 16 for the binary code pattern described above. Thus, Gray code patterns have a lower pattern edge frequency (or spatial frequency) compared to binary code patterns. It is generally preferable to use the lowest frequency patterns possible because this results in the largest and most distinguishable stripes. Patterns with low spatial frequency are less vulnerable to unwanted blending between white and black sections of the pattern that can result in decoding errors. Gray codes also have the useful property that single-bit errors generally decode with an error of ±1, which can simplify error correction or simply provide more graceful failure modes.

Gray codes may map individual pixels or group of pixels. For example, if 1024 pixels are encoded with a Gray code of 10 bits (ten patterns), there will be 1:1 correspondence between Gray code and pixels, for a minimum stripe width of 2 pixels. If 1024 pixels are encoded with a Gray code of 9 bits (nine patterns), there will be a 1:2 correspondence between Gray code and pixels, for a minimum stripe width of 4 pixels. If 1024 pixels are encoded with a Gray code of 8 bits (eight patterns), there will be a 1:4 correspondence between Gray code and pixels, for a minimum stripe width of 8 pixels. Thus, the minimum stripe width may be made larger by mapping Gray codes to a group of pixels, but the resolution of the measurement decreases.

Figure 6:
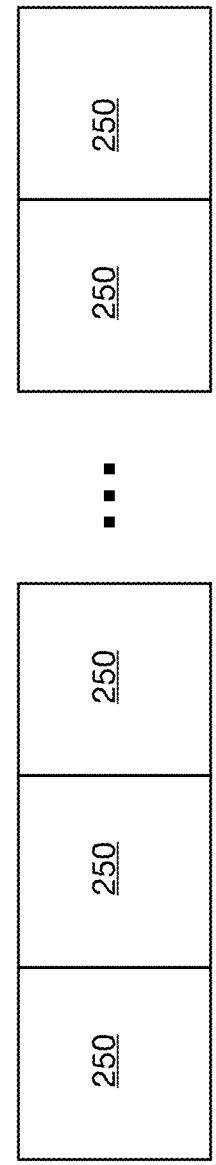
FIG. 6 is a schematic diagram of repeating patterns.
Figure 7A:
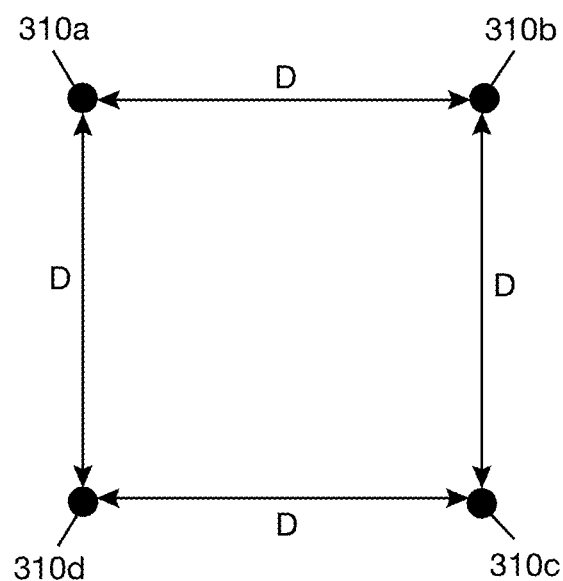
FIG. 7A is a schematic diagram of a global pattern.
Figure 7B:
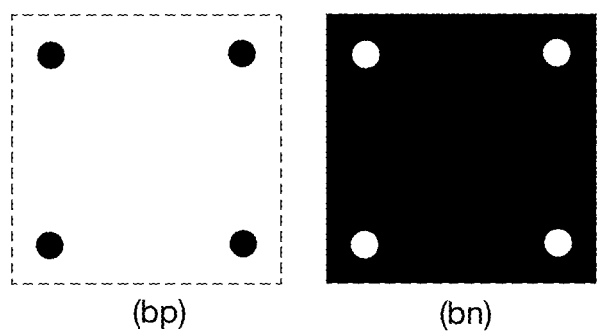
FIG. 7B is a schematic diagram of a sequence of patterns based on the global pattern of FIG. 7A according to one illustrative implementation.

In another example, test patterns may be generated with reduced image coding according to a strategy described herein. The strategy includes generating detail patterns (the patterns that contain the high frequency data or that encode the pixels) based on Gray coding. Instead of selecting a Gray code with a number of bits that will encode an entire dimension, a Gray code with a number of bits that will encode a fraction of the dimension is selected. The pattern that encodes a fraction of the dimension ("detail pattern" or "high-density pattern") is then repeated along the dimension. This is illustrated in FIG. 6, where detail pattern 250 (the structure of the pattern is not shown) is repeated along the dimension. The strategy further includes generating a global pattern that is used to identify a known point or center of the repeating pattern. The identified known point or center will serve as a reference point for counting the pixels of the repeating pattern. In one example, the global pattern contains a small number of features that have known positions in the projector frame buffer and are easy to identify accurately. FIG. 7A shows an example of a global pattern including four features (e.g., dots) 310*a*, 310*b*, 310*c*, 310*d* spaced D frame buffer pixels apart. FIG. 7B shows a sequence of global patterns including a positive pattern (bp) and negative pattern (bn)—the negative pattern (bn) is an inverse of the positive pattern (bp).

Figure 8A:
FIG. 8A is a schematic diagram of a sequence of patterns generated from a Gray code of 2 bits.
Figure 8B:
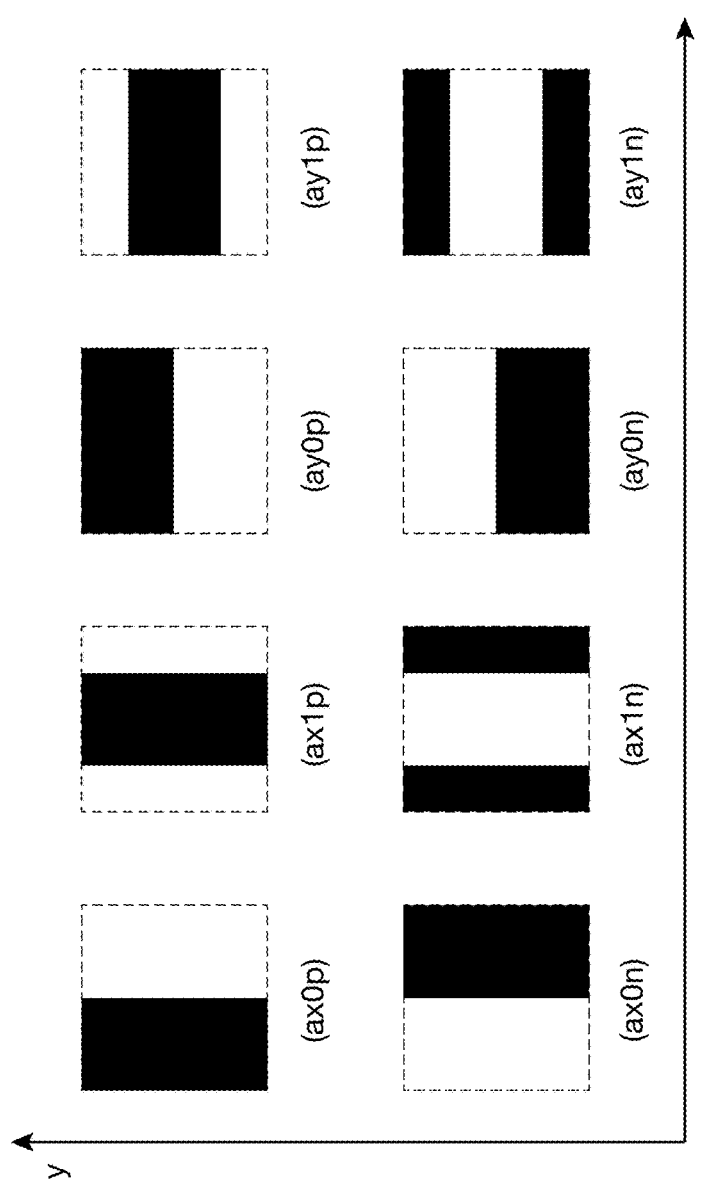
FIG. 8B is a schematic diagram of a sequence of patterns for x and y dimensions based on a Gray code of 2 bits according to one illustrative implementation.

When decoded, the detail patterns assign each pixel (or group of pixels) a number that is locally unique but reused globally. In one example, the detail patterns are generated from a Gray code of 2 bits. For illustration purposes, FIG. 8A shows two patterns generated from a Gray code of 2 bits, where the value goes from 0 to 3. The first pattern 0 (MSB) has a stripe width of 2, and the second and last pattern 1 (LSB) has a stripe width of 2. A Gray code of 2 bits can encode $4(=2^2)$ unique stripes. In a typical implementation, each dimension of the frame buffer is encoded in the same manner using the same Gray code of 2 bits. To encode the x dimension, each row of the image will contain the same pattern, which creates a set of vertical stripes. To encode the y dimension, each column of the image will contain the same pattern, creating horizontal stripes. FIG. 8B shows a set of detail patterns generated as described above for x and y dimensions. Patterns (ax0p) and (ax1p) correspond to the x dimension, and patterns (ay0p) and (ay1p) correspond to the y dimension. Patterns (ax0n) and (ax1n) are negatives of patterns (ax0p) and (ax1p), and patterns (ay0n) and (ay1n) are negatives of patterns (ay0p) and (ay1p). To encode 1024 pixels along one dimension using the detail patterns of FIG. 8B, 256 repetitions of the detail patterns will be used along the dimension. However, only the two detail patterns will be needed to encode 1024 pixels, compared to the nine patterns needed with regular Gray coding for the same resolution.

Figure 8C:
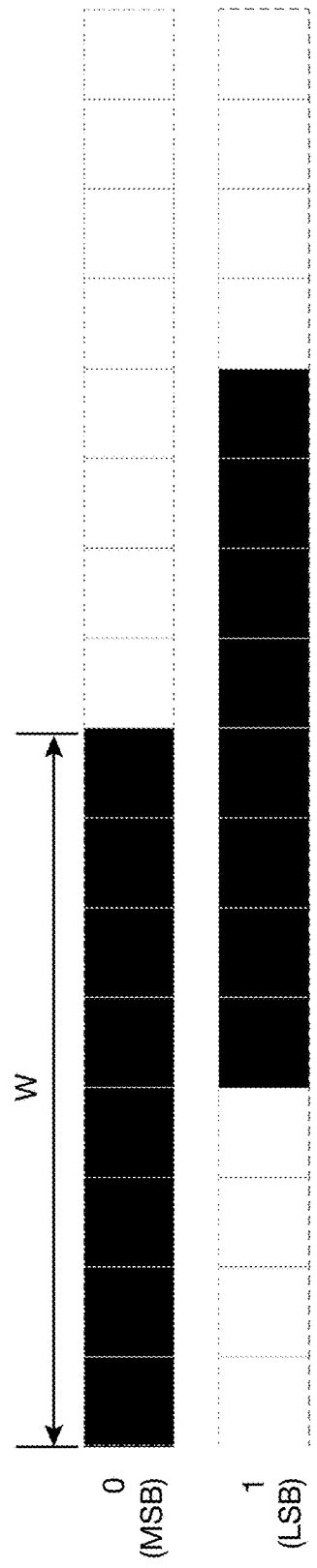
FIG. 8C is a schematic diagram of Gray code patterns having 8-pixel wide stripes.

The number of repetitions of the detail patterns needed to encode each dimension of the frame buffer may be reduced by mapping one Gray code to a group of pixels—this will also increase the size of the features and simplify detection. For example, if 16 pixels are encoded with 2 bits (two patterns), there will be a 1:4 correspondence between Gray code and pixels, for a minimum stripe width of 8 pixels, as shown in FIG. 8C. The images will be offset by 4 pixels (compare pattern 0 to pattern 1). Thus, there will be data for each 4 pixels, but the smallest feature to be identified is 8 pixels. To encode 1024 pixels along one dimension using the Gray code patterns in FIG. 8C, 64 repetitions of the detail patterns will be used along the dimension, compared to the 256 repetitions needed when there is a 1:1 correspondence between Gray code and pixels.

When decoding the captured image of test patterns, the decoding system needs to decide on a brightness threshold to use in deciding whether each pixel in the captured image should be classified as "on" or "off." One way to simplify this process is to project both a positive and negative image for each test pattern. The negative images are the inverses of the positive images (black stripes are made white, and vice versa). Then, pixels in the positive and negative images are compared. Pixels that are brighter in the positive image are classified as "on" and those that are dimmer are classified as "off." The final image will be a differential image. This greatly simplifies decoding, although it doubles the number of patterns captured. FIGS. 7B and 8B show positive and negative test patterns.

The example above results in two global patterns (positive and negative patterns) and eight detailed patterns (positive and negative patterns). These patterns can be used to encode any size of frame buffer. The detail patterns will be repeated along each respective dimension to cover the desired size of frame buffer.

In the example above, the detail patterns are generated using 2 bits per axis or dimension. In another implementation, the detail patterns could be generated using 3 bits per axis or dimension, which would allow tracking of larger distortions, improve error rejection, or some combination of the two during decoding. In theory, the detail patterns could also be generated using 1 bit per axis or even 1 bit per pixel, but this would reduce the precision or accuracy of the decoding compared to 2 bits per axis.

The sequence of patterns is projected by the projector and captured by the camera, producing an image of each projected pattern in the camera space. These images are then decoded to determine a mapping between the projector space and the camera space. In one implementation, to generate a mapping between the projector space and the camera space, the captured image of the global pattern (captured global image) is first decoded. For example, image recognition may be used to find the known features in the captured global image and to decide which feature in the captured global image corresponds to which feature in the frame buffer global pattern. This process will result in a coarse correlation between the projector space and the camera space. For the example where the global pattern uses four features with known positions in the frame buffer, this process will generate a map with four points in the projector space (or frame buffer) and corresponding four points in the camera space.

Next, the captured images of the detail patterns (captured detailed images) are decoded to assign each camera pixel an x, y value that corresponds to the Gray code of the pixel position. Pixels may also be assigned a preliminary confidence value based on the local brightness contrast and/or other image quality factors. This is a standard Gray code decoding process, with the exception that the result will consist of repeating "tiles" from [0, M), where M is the number of distinct Gray code values used per axis. $M=2^m$, where m is the number of bits encoding the axis. In the example where each axis is encoded with a 2 bit Gray code, M=4. M may also be referred to as low value count.

Each pixel in the frame buffer corresponds to a region, normally consisting of multiple adjacent pixels, in the captured image. The two low bits corresponding to each pixel are given by the Gray code decoding process. Now, the high bits are needed to obtain the actual address of the pixel in the frame buffer. Using the decoded global pattern data, a mathematical model, called a bootstrap model herein, is generated between the frame buffer space and the camera space. In one implementation, this may be a simple linear model of the form y=A+BX+CY; x=D+EX+FY, where x, y represent points in the frame buffer space and X, Y represent points in the camera space. Next, a bootstrap region is selected and decoded. The selected bootstrap region should be one for which the bootstrap model is a good approximation. In one implementation, the selected bootstrap region is the region bounded by the four known points in the global image. In an example where the points are spaced apart by 32 pixels (i.e., D in FIG. 7A is 32 pixels) and the stripes of the detail pattern are 8 pixels wide, the region bounded by the four points will have two repeats of the detail pattern in each dimension. Decoding the bootstrap region includes inferring the high bits for each pixel in the bootstrap region.

One example of inferring the high bits for each pixel includes calculating the expected frame buffer value using the bootstrap model. Next, the nearest frame buffer value to the expected value that has the same low bits as the captured image (of x and y) is calculated. If the distance to nearest frame buffer value is no more than a distance threshold, the pixel is assigned that value; otherwise, the pixel is not decoded. In one example, the distance threshold is 0.25×M, where M is the number of distinct Gray code values used per axis or the low value count. For the case where each axis is encoded by a 2 bit Gray code, M=4. A different distance threshold may be used. Further, the distance metric may be applied either to each axis independently or as a combined distance.

To illustrate the process of inferring high bits, consider an example with 2 low bits encoded with Gray code. The low bits may have a value of 0, 1, 2, or 3. For a pixel which the bootstrap model predicts an x value of 100.1, the reconstructed value depends on the decoded value as follows:

Case 0: The nearest integer value to 100.1 such that result % 4=0 is 100. This has a distance of 0.1, which is no more than a distance threshold of 1. Thus the pixel is accepted with a result of 100.

Case 1: The nearest integer value to 100.1 such that result % 4=1 is 101. This has a distance of 0.9, which is no more than a distance threshold of 1. Thus the pixel is accepted with a result of 101.

Case 2: The nearest integer value to 100.1 such that result % 4=2 is 102. This has a distance of 1.9, which is more than a distance threshold of 1. Thus the pixel is rejected.

Case 3: The nearest integer value to 100.1 such that result % 4=3 is 99. This has a distance of 1.1, which is no more than a distance threshold of 1. Thus the pixel is rejected.

Next, a region that substantially overlaps the previously decoded area and contains a new region that has not been decoded is selected. A new mathematical model is built based on the previously decoded data. Then, the new area is decoded using the same technique used to decode the bootstrap region. This is repeated until the entire image is decoded. The result will be a detailed map with points in the frame buffer and corresponding points in the camera space.

Figure 9:
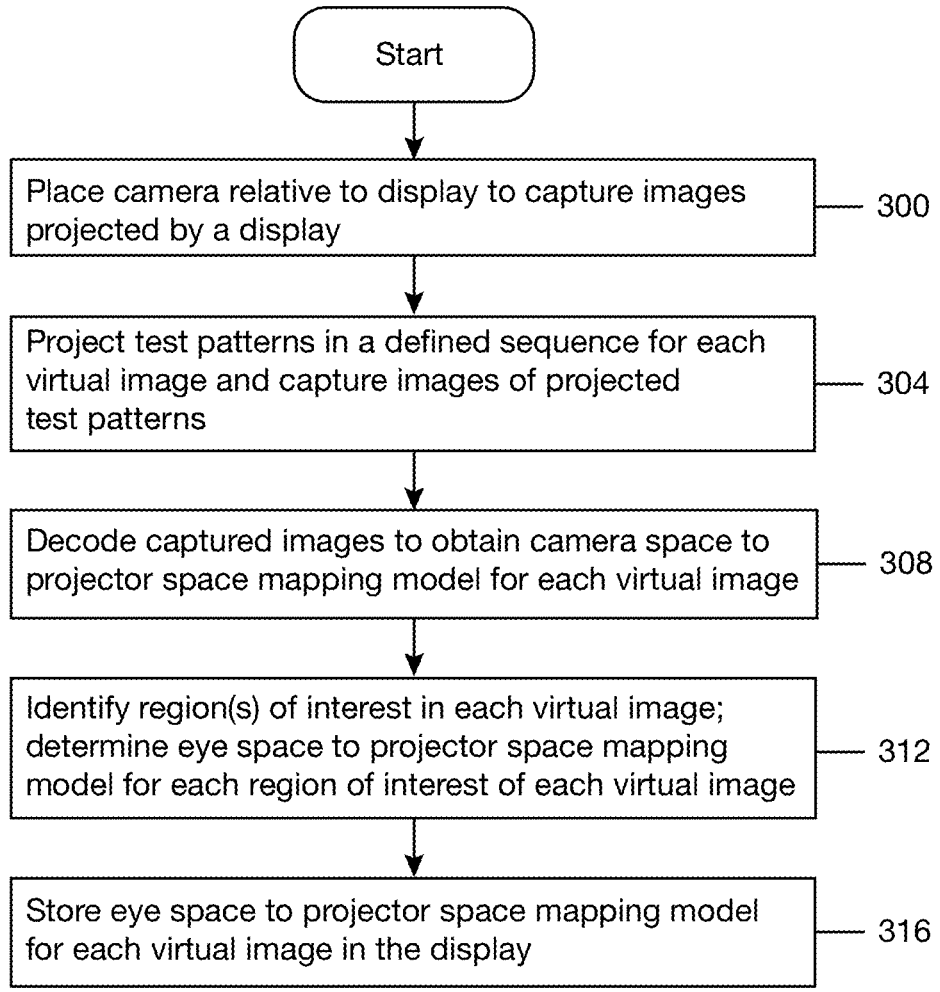
FIG. 9 is a flowchart illustrating a process of determining a distortion model according to one illustrative implementation of the present disclosure.
Figures 1, 10A:
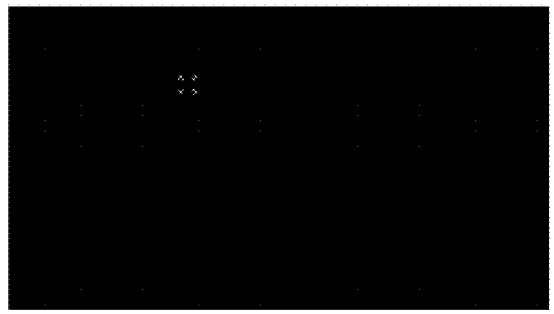
Figures 2, 10A:
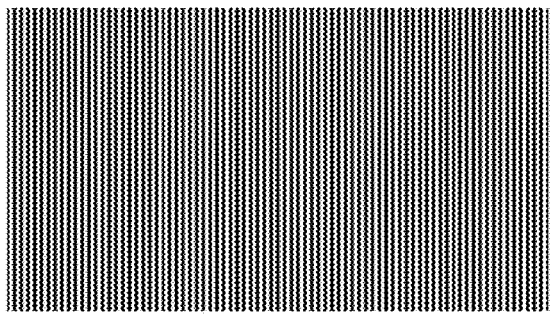
Figures 3, 10A:
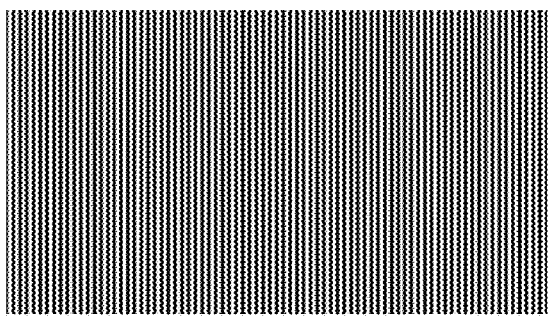
Figures 4, 10A:
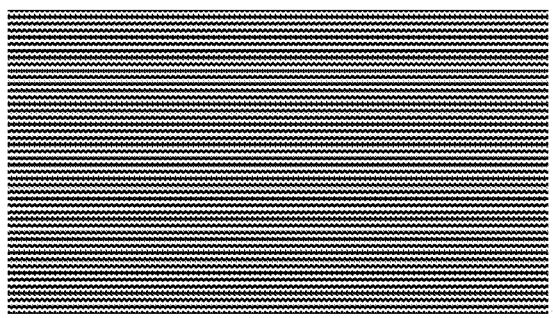
Figures 5, 10A:
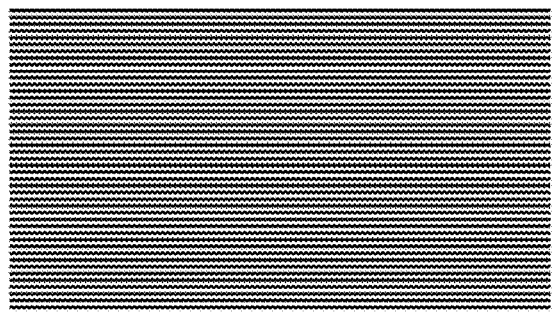
Figures 1, 10B:
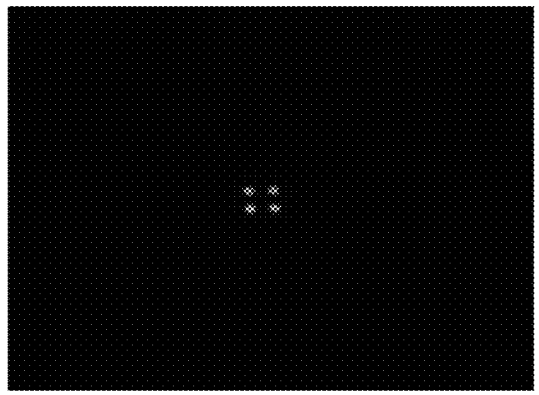
Figures 2, 10B:
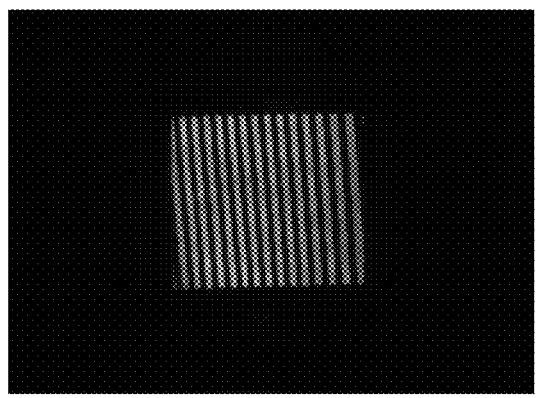
Figures 3, 10B:
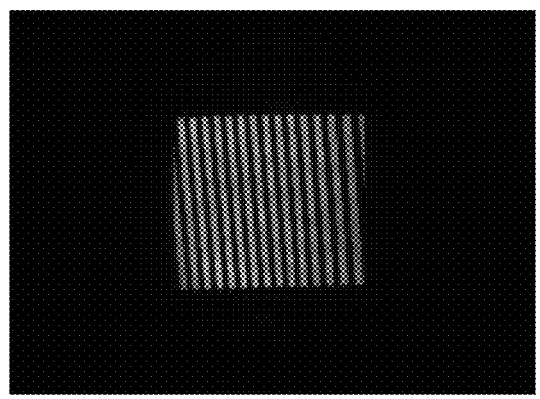
Figures 4, 10B:
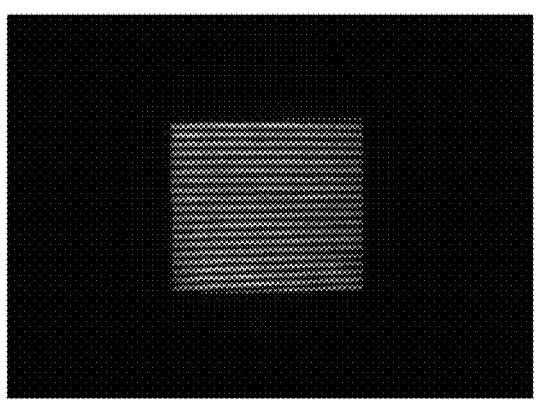
Figures 5, 10B:
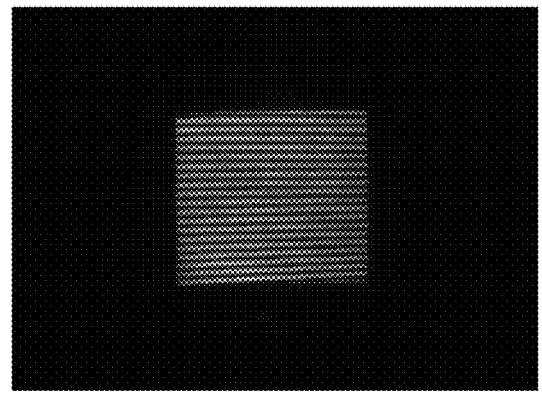

FIG. 9 illustrates a process for calibrating a WHUD to produce virtual images that are overlapping and aligned in an eye space. At 300, a camera (e.g., 200 in FIG. 2) is placed relative to the WHUD (e.g., 100 in FIG. 2) at approximately the same position as an eye would be if a display UI is to be presented to the eye by the WHUD. In this position, the camera can receive or detect light signals from the WHUD (or from the transparent combiner of the WHUD).

At 304, for each virtual image V(i,j), where i represents a particular color channel and j represents a particular exit pupil, each test pattern from the set of test patterns is projected to a field of view of the camera in a defined sequence. The test patterns may be the reduced image coding patterns (e.g., the global and detailed Gray code patterns in FIGS. 7B and 8B) or any other test patterns that enable mapping of the projector space to the camera space. FIGS. 10A-1, 10A-2, 10A-3, 10A-4, and 10A-5 show screenshots of actual test patterns used in a calibration process according to one example. Only the positive test patterns are shown in FIGS. 10A1-10A-5, but the full set of test patterns also includes the inverses of the patterns shown in FIGS. 10A1-10A-5. The same set of test patterns is projected for all virtual images, with the exception that the test patterns are cropped to approximately the correct display region to minimize stray light. Also, when projecting the patterns through a particular color channel, white is changed to the color of that channel. Thus, for example, red and black stripes will be projected if the color channel of interest is red.

Displaying each test pattern in a field of view of the camera includes rendering the test pattern into the projector frame buffer, generating light signals representative of the frame buffer data, and projecting the light signals to the transparent combiner (114 in FIG. 2) in the field of view of the camera (200 in FIG. 2). Projection of the light signals to the transparent combiner may involve an optical splitter (116 in FIG. 2) or other exit pupil replication structure as described previously, e.g., if the transparent combiner is a holographic combiner. For each test pattern displayed in the field of view of the camera (or projected to an exit pupil of the display via the transparent combiner), the camera captures an image of the displayed test pattern. FIGS. 10B-1, 10B-2, 10B-3, 10B-4, and 10B-5 show screenshots of actual captured images corresponding to the test patterns in FIGS. 10A-1, 10A-2, 10A-3, 10A-4, and 10A-5, respectively.

Returning to FIG. 9, in one implementation of 304, the sequence of test patterns is projected separately for each unique combination of color channel and exit pupil. That is, given a unique combination of color channel and exit pupil, the sequence of test patterns is projected. Then, this is repeated for each of the remaining unique combinations of color channel and exit pupil.

In another implementation of 304, multiple copies of each test pattern in a sequence of test patterns are generated. For each position in the sequence, the multiple copies of the test pattern for that position are projected simultaneously, each copy following an optical path defined by a unique combination of color channel and exit pupil. For example, given 3 color channels and exit pupil EP0 for which test patterns are to be projected simultaneously, the process may be as follows: for each position in the sequence of test patterns, a copy of the test pattern for that position for V(i,j) is generated, where i in 0 . . . 2 (e.g., 0=red channel, 1=green channel, 2=blue channel) and j=0 (e.g., 0=exit pupil EP0), and the copies are projected simultaneously—this may be repeated for other exit pupils. In the implementation where multiple copies of a test pattern are projected for each position in the sequence, the camera may capture the multiple projected copies of the test pattern, which means that the captured image will contain data for more than one unique combination of color channel and exit pupil. If the multiple projected copies are distinguished by color, the camera will need to be able to distinguish between colors to allow the information for each unique combination of color channel and exit pupil to be isolated.

At 308, for each virtual image V(i,j), the captured images are decoded to find correspondence between projector frame buffer pixels and camera pixels. This results in a mapping P(i,j)→C(i,j) from the projector space to the camera space. In one example, the mapping P(i,j)→C(i,j) may be explicit correlations between the projector space and camera space for every projector frame buffer pixel, which may be in the form of a lookup table. (If the test patterns are generated using the reduced imaging coding previously described, then the companion decoding process previously described may be used to map between the projector space and camera space.) However, other models are possible, such as 2D polynomial models, splines, light-path models (i.e., models that more accurately reflect the actual optics of the system), or other abstract models. The other models may be obtained by performing at least one transformation between the points in the projector space and the points in the camera space, such as a linear transformation, a non-linear optimization, an affine transformation, a neural network-based transformation, and the like.

At 312, for each mapping P(i,j)→C(i,j) from the projector space to the camera space corresponding to each virtual image V(i,j), a mapping C(i,j)→E from the camera space to the eye space is acquired. The mapping C(i,j)→E from the camera space to the eye space may be an existing mapping or may be determined at the beginning of the calibration process. In one example, the C(i,j)→E mapping may be derived by theoretical modeling of the optics of the camera (including any lens) and the physical placement of the camera relative to the transparent combiner. In another example, the C(i,j)→E mapping may be derived or refined by placing a physical reference object, e.g., a flat surface with a checkerboard, at the same position relative to the camera that the virtual image from the transparent combiner will appear and making measurements based on this setup. In this case, the model between the camera and the image of the reference object would match the model between the camera and the desired virtual image. Developing a mapping between the camera and a flat reference surface is a common problem with multiple well documented solutions. See, for example, a tutorial on camera calibration in the documentation for the popular OpenCV machine vision library ("Camera Calibration with OpenCV, Open CV 2.4.13.7 Documentation" Web. 9 Aug. 2018).

One or more regions of interest are identified for each virtual image V(i,j) in the eye space. The regions of interest may include regions of the virtual image where the virtual image overlaps all other virtual images in the eye space. The regions of interest may further include regions of the virtual image where the virtual image does not overlap any other virtual image or overlaps only some of the other virtual images. The regions of interest may exclude regions of the virtual image that are not needed or usable to form a display UI that is seen by a user. The regions of interest may also be optimized for other objectives including size, position, or image quality.

Within each defined region of interest, for each virtual image V(i,j), a mapping E→P(i,j) from the eye space to the projector space is determined using the mapping P(i,j)→C(i,j) from the projector space to the camera space and the mapping C(i,j)→E from the camera space to the eye space. This may either be a direct mathematical transform or may include additional filtering (for example, noise filtering, interpolation, or extrapolation). The eye space E is common across all virtual images. Therefore, for any point in the eye space E within the overlapping region of interest, applying the appropriate mapping E→P(i,j) generates a coordinate in the corresponding projector space.

At 316, the E→P(i,j) mapping for each defined region of interest for each virtual image V(i,j) may be stored in the WHUD, e.g., in memory 136 or storage 138 in FIG. 3, and used for subsequent generation of a corresponding distorted source image S'(i,j). If the display has N≥1 separately addressable exit pupils and K≥1 color channels, there will generally be N times K virtual images and corresponding N times K E→P (eye space to projector space) mappings. Alignment of virtual images in the target eye space becomes relevant when N times K>1, i.e., there will be two or more virtual images in the target eye space.

The acts above have generated for each virtual image V(i,j), a mapping E→P(i,j) from common eye space E to unique projector space P(i,j) for that virtual image within the defined region(s) of interest. Now, a display UI may be displayed within which exhibits both geometric correction and alignment between virtual images. To present a display UI in the eye space, distorted source images are generated. This may also be regarded as rendering the source images into the eye space. To generate the distorted source image, for each pixel of the distorted source image, the corresponding point in the eye space is found using the mapping E→P(i,j). The lookup may apply a simple "nearest neighbor", bi-linear interpolation, or other common sampling algorithm. The sampling may also explicitly consider the area of each pixel, mapping the points at the corners or bound of the pixel. In one example, the sampling algorithm may perform the interpolation in a linear color space. When the frame buffer pixels are projected to the eye space, the distorted source images will form virtual images in the eye space that are aligned at least within the defined regions of interest. The source images can be distorted when rendering the source images into the frame buffer or after rendering the source images into the frame buffer. In the latter case, the display controller (e.g., 142 in FIG. 3) may generate the distorted source images. Projection of the distorted source images includes generating light and modulating the light with the distorted source images. In one example, modulating the light with the distorted source images may include the display controller providing the distorted source image data to the light engine driver (146 in FIG. 3), which then generates controls for the light engine (118 in FIG. 3) according to the distorted source image data.

Changes in temperature of the projector (and other elements in the light projection path) may affect the nonlinear distortion experienced by each virtual image formed in the eye space. To account for this, acts 304-316 may be performed at a first temperature T1 of the projector—any reasonable element in the projector, such as a body of the light engine or cavity in the projector, may provide an indication of the temperature of the projector. Acts 304-316 may be repeated for at least another second temperature T2 of the projector that is different from the first temperature T1. This will yield a mapping E→P(i,j)$_{T1}$ at the first temperature T1 and a mapping E→P(i,j)$_{T2}$ at the second temperature. In this case, distorting the source images may include: for each frame buffer pixel in each projector space P(i,j) that generates virtual image V(i,j), look up a corresponding point at T1 in the eye space using the corresponding mapping E→P(i,j)$_{T1}$, look up a corresponding point at T2 in the eye space using the corresponding mapping E→P(i,j)$_{T2}$, and interpolate between these corresponding points, or extrapolate from these corresponding points, based on the current temperature of the projector to obtain the corresponding point in the eye space for the current temperature of the projector. The above requires measuring the temperature of the projector, and the temperature measurements may be provided to the application processor. This technique additionally or alternatively may be applied to other elements of the light path using other temperature measurement points, e.g., the temperature of the transparent combiner may be relevant and may not be well correlated with the temperature of the projector. In the case where the temperature of the transparent combiner may be more relevant, the distortion models (E→P(i,j)) can be determined for different temperatures of the transparent combiner and used for subsequent generation of the distorted source images.

Figure 11:
FIG. 11 is an image of a logo or an example display UI.
Figure 12:
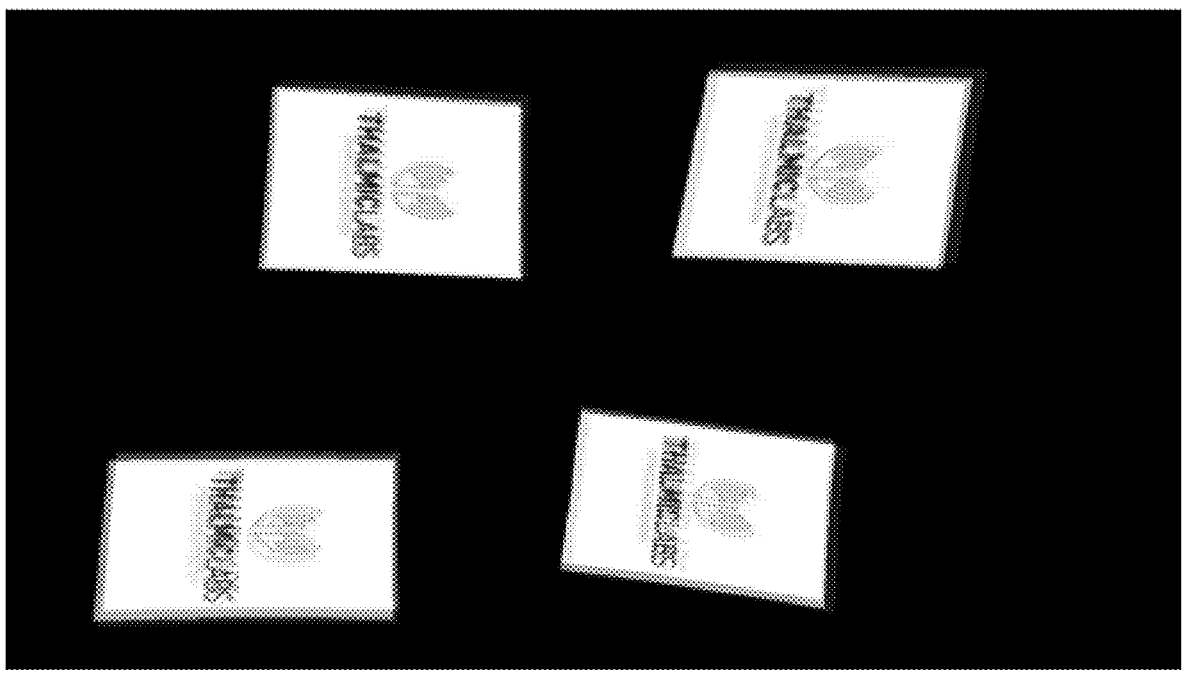
FIG. 12 is a screenshot of a projector frame buffer containing distorted source images corresponding to the image or display UI of FIG. 11 according to one example.

FIG. 11 shows an image of a logo (display UI) that is to be displayed to a user according to one example. FIG. 12 shows a screenshot of the distorted source images in the projector frame buffer. This example has 4 frame buffer regions from which distorted source images are to be projected to 4 spatially-separated exit pupils. Each frame buffer region may contain a distorted source image for each of the color channel used by the projector, which means that there may be more than one distorted source image in each frame buffer region. When these distorted source images are projected to the eye space, they will form a display UI that appears as the original image of the logo to be displayed.

Although the calibration process has been described with reference to a WHUD having a scanning laser projector, the calibration process need not be limited as such. For example, the calibration process may be applied to a WHUD that uses digital light projector (DLP) or organic light-emitting (OLED) projector.

The foregoing detailed description has set forth various implementations or embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation or embodiment, the present subject matter may be implemented via Application Specific Integrated Circuits (ASICs). However, those skilled in the art will recognize that the implementations or embodiments disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this disclosure, a "non-transitory processor-readable medium" or "non-transitory computer-readable memory" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples of the processor-readable medium are a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory medium.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. A method of calibrating a wearable heads-up display, the method comprising:
for each virtual image to be formed by the wearable heads-up display in a target eye space, determining a distortion model for use in distorting a source image corresponding to the virtual image, wherein determining the distortion model comprises:
projecting a set of test patterns by a projector of the wearable heads-up display in a select sequence;

capturing an image of each test pattern projected by the projector by a camera;
determining a first mapping that maps points in a projector space to points in a camera space from the captured images;
acquiring a second mapping that maps points in the camera space to points in the target eye space;
determining a third mapping that maps points in the target eye space to points in the projector space based on the first mapping and the second mapping; and
storing the third mapping as the distortion model for use in distorting the source image corresponding to the virtual image.

2. The method of claim 1, wherein determining a first mapping that maps points in a projector space to points in a camera space from the captured images comprises decoding the captured images to find correspondence between projector frame buffer pixels and camera pixels.

3. The method of claim 2, wherein decoding the captured images to find correspondence between projector frame buffer pixels and camera pixels comprises detecting Gray codes in the captured images.

4. The method of claim 1, wherein determining a third mapping that maps points in the target eye space to points in the projection space based on the first mapping and the second mapping comprises identifying at least one region of interest in the target eye space and determining the third mapping for the at least one region of interest in the target eye space.

5. The method of claim 1, wherein determining the distortion model for use in distorting a source image corresponding to the virtual image is performed at a first temperature to obtain a distortion model at the first temperature and at a second temperature to obtain the distortion model at the second temperature.

6. The method of claim 1, wherein projecting a set of test patterns by the projector of the wearable heads-up display in a select sequence comprises:
for each position in the select sequence, generating copies of the test pattern at the position and projecting the copies of the test pattern by the projector of the wearable heads-up display, wherein each of the copies corresponds to a unique combination of exit pupil and color channel of the wearable heads-up display.

7. The method of claim 6, wherein capturing an image of each test pattern projected by the projector by a camera comprises capturing an image having image portions corresponding to the copies of the test patterns by the camera.

8. The method of claim 7, wherein determining a first mapping that maps points in a projector space to points in a camera space from the captured images comprises determining the first mapping for each unique combination of color channel and exit pupil using the image portions of the captured image corresponding to the unique combination of color channel and exit pupil.

9. The method of claim 1, further comprising generating the set of test patterns prior to determining a distortion model for use in distorting a source image corresponding to the virtual image, wherein generating the set of test patterns comprises generating at least one pattern carrying codes.

10. The method of claim 9, wherein generating at least one pattern carrying codes comprises generating the at least one pattern with a Gray code of m bits, where m 1.

11. The method of claim 9, wherein determining a first mapping that maps points in a projector space to points in a camera space from the captured images comprises decoding the at least one pattern carrying codes.

12. The method of claim 9, wherein generating the set of test patterns further comprises generating at least one additional pattern having features with known positions in a frame buffer of the projector.

13. The method of claim 12, wherein determining a first mapping that maps points in a projector space to points in a camera space from the captured images comprises decoding the at least one pattern carrying codes and the at least one additional pattern having features with known positions in the frame buffer of the projector.

14. The method of claim 1, wherein projecting a set of test patterns by a projector of the wearable heads-up display in a select sequence comprises transmitting the set of test patterns to a processor of the wearable heads-up display, wherein the processor of the wearable heads-up display renders the set of test patterns into a frame buffer of the projector in the select sequence.

15. The method of claim 1, wherein storing the third mapping as the distortion model for use in distorting the source image corresponding to the virtual image comprises storing the third mapping in a non-transitory processor-readable storage medium of the wearable heads-up display.

16. The method of claim 1, wherein capturing an image of each test pattern projected by the projector by a camera comprises positioning the camera relative to the wearable heads-up display to capture at least a portion of images projected by the wearable heads-up display.

17. A wearable heads-up display calibration system, comprising:
a wearable heads-up display comprising a projector;
a camera positioned and oriented to capture images projected by the projector;
a calibration processor communicatively coupled to the wearable heads-up display and camera; and
a non-transitory processor-readable storage medium communicatively coupled to the calibration processor, wherein the non-transitory processor-readable storage medium stores data and/or processor-executable instructions that, when executed by the calibration processor, cause the calibration processor to determine a distortion model that maps points from a target eye space to points in a projector space for each virtual image to be produced in the target eye space by the wearable heads-up display, wherein the calibration processor is to determine the distortion model by:
capturing, via the camera, an image of each test pattern of a set of test patterns projected by a projector in a select sequence;
determining a first mapping that maps points in the projector space to points in a camera space from the captured images;
acquiring a second mapping that maps points in the camera space to points in the target eye space;
determining a third mapping that maps points in the target eye space to points in the projector space based on the first mapping and the second mapping; and
storing the third mapping as the distortion model.

18. The wearable heads-up display of claim 17, wherein the wearable heads-up display further comprises a processor, and wherein the calibration processor is communicatively coupled to the processor of the wearable heads-up display.

19. The wearable heads-up display of claim 17, further comprising:
the projector, wherein the projector is to project the set of test patterns in the select sequence by:
for each position in the select sequence, generating copies of the test pattern at the position and projecting the copies of the test pattern by the projector of the wearable heads-up display, wherein each of the copies corresponds to a unique combination of exit pupil and color channel of the wearable heads-up display.

20. The wearable heads-up display of claim 19, wherein the processor is to capture, via the camera, an image of each test pattern projected by the projector by capturing, via the camera, an image having image portions corresponding to the copies of the test patterns by the camera.

21. The wearable heads-up display of claim 20, wherein the processor is to determine the first mapping by determining the first mapping for each unique combination of color channel and exit pupil using the image portions of the captured image corresponding to the unique combination of color channel and exit pupil.

22. The wearable heads-up display of claim 17, wherein the non-transitory processor-readable storage medium stores data and/or processor-executable instructions that, when executed by the calibration processor, further cause the calibration processor to generate the set of test patterns prior to determining a distortion model for use in distorting a source image corresponding to the virtual image, wherein generating the set of test patterns comprises generating at least one pattern carrying codes, and wherein generating the set of test patterns further comprises generating at least one additional pattern having features with known positions in a frame buffer of the projector.

* * * * *